United States Patent
Kaneko et al.

(10) Patent No.: US 6,422,682 B1
(45) Date of Patent: Jul. 23, 2002

(54) IMAGE PROCESSING APPARATUS, CONTROL METHOD THEREOF, INFORMATION SCANNING APPARATUS, RECORDING APPARATUS, INFORMATION SCANNING METHOD, AND STORAGE MEDIUM

(75) Inventors: Kiyoshi Kaneko; Tadashi Yamamoto, both of Yokohama; Akihiko Nakatani, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,622

(22) Filed: Oct. 15, 1999

(30) Foreign Application Priority Data

Oct. 21, 1998 (JP) .............................. 10-317001
Aug. 25, 1999 (JP) .............................. 11-238187

(51) Int. Cl.[7] .............................. B41J 23/00; B41J 2/435
(52) U.S. Cl. .............................. 347/37; 347/248
(58) Field of Search .............................. 347/37, 40, 86, 347/166, 234, 237, 248; 400/279, 282; 382/813; 250/235; 310/12

(56) References Cited

U.S. PATENT DOCUMENTS

| | | | | |
|---|---|---|---|---|
| 4,789,874 A | * | 12/1988 | Majette et al. | 347/37 |
| 4,959,871 A | * | 9/1990 | Mori et al. | 382/313 |
| 6,010,206 A | * | 1/2000 | Simons | 347/40 |
| 6,037,584 A | * | 3/2000 | Johnson et al. | 250/235 |
| 6,064,128 A | * | 5/2000 | Yagoto et al. | 310/12 |
| 6,152,626 A | * | 11/2000 | Yanagi et al. | 400/279 |
| 6,174,043 B1 | * | 1/2001 | Ogata | 347/40 |

* cited by examiner

*Primary Examiner*—Hai Pham
(74) *Attorney, Agent, or Firm*—Morgan & Finnegan LLP

(57) ABSTRACT

This invention has as its object to provide an image processing apparatus which can implement high-precision, high-resolution image scanning, and can prevent disturbance of the scanned image, when it mounts a scanner unit. To achieve this object, an image processing apparatus which has a recording head detachable from a main body and/or a scanner unit detachable from the main body, has a carriage for supporting and moving the recording head or scanner unit, an encoder for measuring the moving position of the carriage, and outputting a signal indicating that the carriage is located at a predetermined moving position, and a signal generation circuit for generating a scanning time signal of the scanner unit in accordance with the signal output from the encoder upon scanning an image by the scanner unit.

24 Claims, 5 Drawing Sheets

IMAGE PROCESSING APPARATUS, CONTROL METHOD THEREOF, INFORMATION SCANNING APPARATUS, RECORDING APPARATUS, INFORMATION SCANNING METHOD, AND STORAGE MEDIUM

BACKGROUND OF THE INVENTION

The present invention relates to an image processing apparatus or the like such as a recording apparatus in which an image scanning means is detachably attached to the carriage of the main body.

Conventionally, an ink-jet recording apparatus which also has a scanner function by detachably attaching an image scanning means to the carriage of the recording apparatus has been proposed.

A recording apparatus of this type estimates the moving position of the carriage based on the rotational speed or angle of a motor as a moving means of the carriage, so as to serve as a recording apparatus or image scanning apparatus (Japanese Patent Publication Nos. 1-20832, 2-21712, 2-21711, and the like).

However, in the above prior art, since the moving position of the carriage is estimated from the rotational speed or angle of the motor, the following problems are posed.

(1) Since any physical size error of the motor itself is directly reflected in positional precision, it is hard to assure high positional precision.

(2) Since the moving position information of the carriage is estimated information and does not indicate absolute position, if a positional deviation occurs in the moving position information of the carriage due to some disturbance, the carriage is driven from at the deviated position, and tedious recovery processes are additionally required.

Furthermore, due to the presence of the aforementioned problems, when the recording apparatus mounts the image scanning means on the carriage and operates as an image scanning apparatus, the following problems are posed.

(3) The image scanning position with respect to the original cannot be obtained with high precision.

(4) Since the rotational speed, angle, or the like of the motor suffers nonuniformity (owing to parts precision, assembly precision, errors, and the like), the image scanning period that defines an accumulation time at every predetermined rotational speed or angle of the motor is not constant. That is, since the time for receiving light reflected by the original by a sensor (the accumulation time) depends on the moving distance of the carriage, the accumulation time is not constant.

From these problems, when the conventional image processing apparatus is used as an image scanning apparatus, disturbance of the scanned image cannot be avoided.

SUMMARY OF THE INVENTION

The present invention has been made in consideration of the conventional problems, and has as its object to provide an image processing apparatus which can prevent disturbance of the scanned image by implementing high-precision, high-resolution image scanning when an image scanning means is attached, its control method, and a storage medium.

It is another object of the present invention to provide an information scanning apparatus, a recording apparatus, an information scanning method, and a storage medium, which can stably supply light for scanning information at an accurate position, and can scan an original image with high precision.

In order to solve the aforementioned problems and to achieve the above objects, an image processing apparatus according to the present invention is characterized by the following arrangement.

That is, there is provided an image processing apparatus which has recording means detachable from a main body and/or image scanning means detachable from the main body, comprising: carriage means for supporting and moving the recording means or the image scanning means; distance measuring means for measuring a moving position of the carriage means, and outputting a signal indicating that the carriage means is located at a predetermined moving position; and signal generation means for generating a scanning time signal of the image scanning means in accordance with the signal output from the distance measuring means upon scanning an image by the image scanning means.

A method of controlling an image processing apparatus according to the present invention is characterized by the following arrangement.

That is, there is provided a method of controlling an image processing apparatus which has recording means detachable from a main body and/or image scanning means detachable from the main body, comprising the steps of: measuring a moving position of carriage means for supporting and moving the recording means or the image scanning means; outputting a signal indicating that the carriage means is located at a predetermined moving position; and generating a scanning time signal of the image scanning means in accordance with the signal output from the distance measuring means upon scanning an image by the image scanning means.

A storage medium according to the present invention is characterized by the following arrangement according to its first aspect.

That is, there is provided a storage medium which stores a computer readable program for controlling an image processing apparatus which has recording means detachable from a main body and/or image scanning means detachable from the main body, the program including: a process for measuring a moving position of carriage means for supporting and moving the recording means or the image scanning means; a process for outputting a signal indicating that the carriage means is located at a predetermined moving position; and a process for generating a scanning time signal of the image scanning means in accordance with the signal output from the distance measuring means upon scanning an image by the image scanning means.

An information scanning apparatus according to the present invention is characterized by the following arrangement.

That is, there is provided an information scanning apparatus which comprises scanning means for scanning information on a recording medium using light emitted by a light source, and carriage means for supporting and moving the scanning means, comprising: distance measuring means for measuring a moving position of the carriage means; and ON time signal generation means for generating an ON time signal for turning on the light source on the basis of a measurement result of the distance measuring means.

A recording apparatus according to the present invention is characterized by the following arrangement.

That is, there is provided a recording apparatus, which comprises carriage means on which one of recording means for recording information and scanning means for scanning information on a recording medium using light emitted by a light source is detachably attached, and which supports and moves the recording means and the scanning means, comprising: distance measuring means for measuring a moving position of the carriage means; and ON time signal generation means for generating an ON time signal for turning on the light source on the basis of a measurement result of the distance measuring means upon scanning by the scanning means.

An information scanning method according to the present invention is characterized by the following arrangement.

That is, there is provided an information scanning method using an information scanning apparatus which comprises scanning means for scanning information on a recording medium using light emitted by a light source, and carriage means for supporting and moving the scanning means, executing: a distance measuring process for measuring a moving position of the carriage means; and an ON time signal generation process for generating an ON time signal for turning on the light source on the basis of a measurement result of the distance measuring process.

A storage medium according to the present invention is characterized by the following arrangement according to its second aspect.

That is, there is provided a storage medium, which stores a computer readable program for executing an information scanning method of an information scanning apparatus which comprises scanning means for scanning information on a recording medium using light emitted by a light source, and carriage means for supporting and moving the scanning means, the information scanning method comprising: the distance measuring step of measuring a moving position of the carriage means; and the ON time signal generation step of generating an ON time signal for turning on the light source on the basis of a measurement result in the distance measuring step.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described hereinafter with reference to the accompanying drawings.

[First Embodiment]

Figure 1:
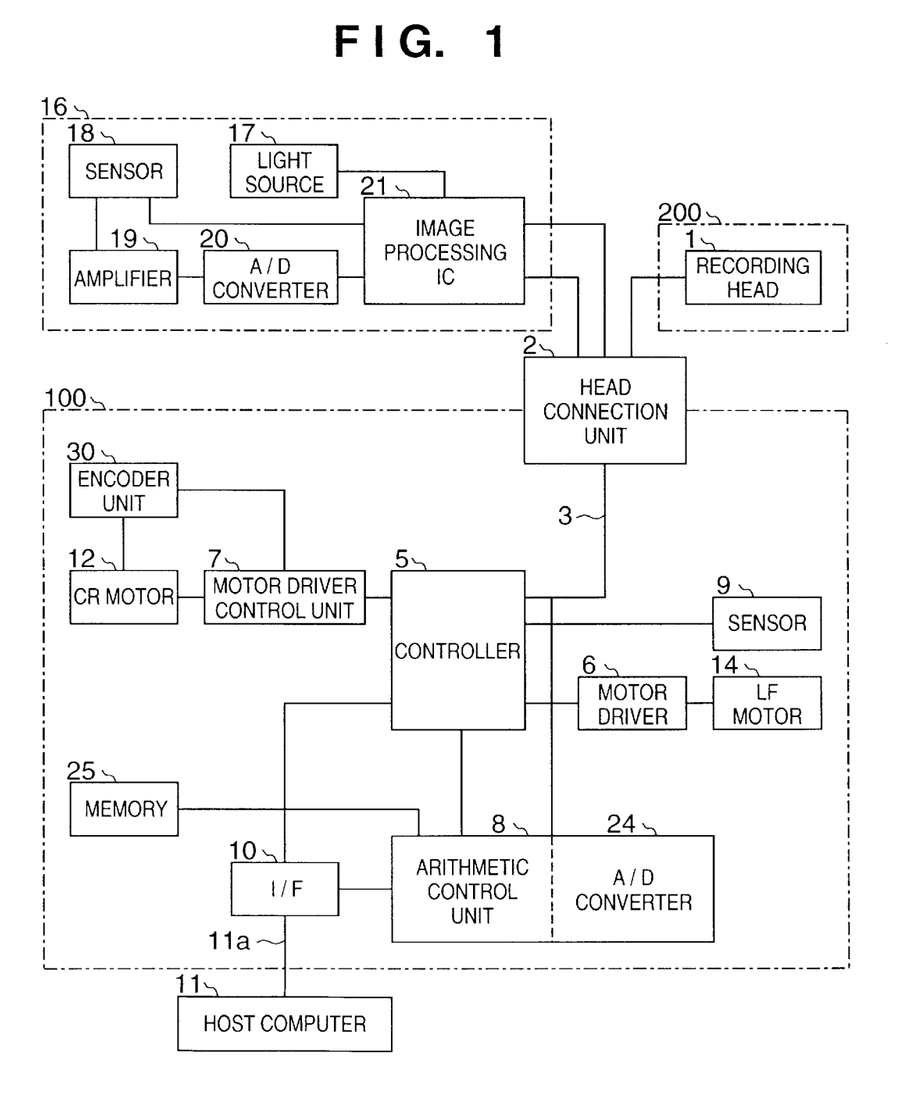
FIG. 1 is a schematic block diagram showing the arrangement of an image processing apparatus according to the first embodiment of the present invention.
Figure 2:
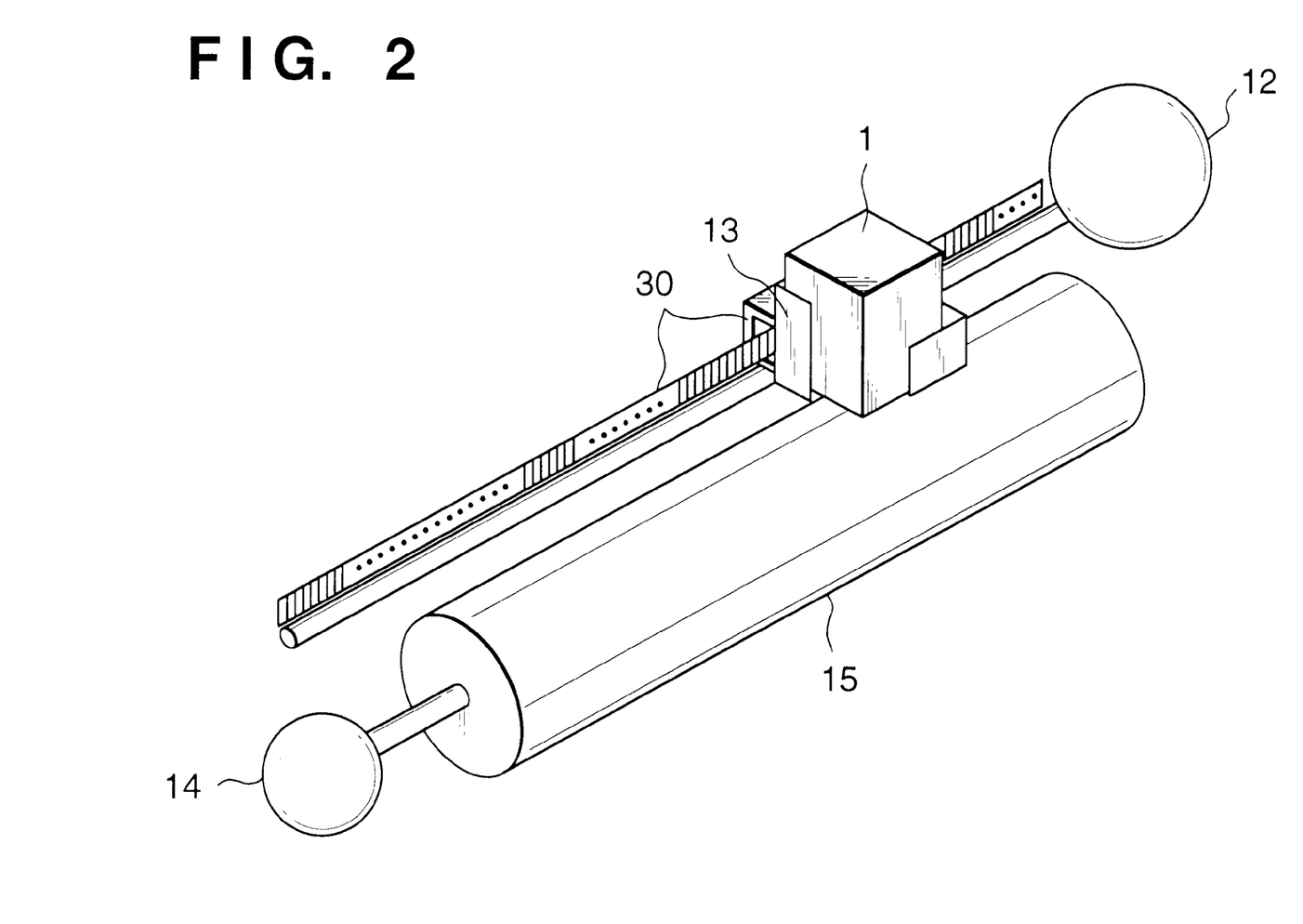
FIG. 2 is a perspective view showing the structure of principal part of a recording apparatus shown in FIG. 1.

FIG. 1 is a schematic block diagram showing the arrangement of an ink-jet recording apparatus (to be referred to as a "recording apparatus" hereinafter according to the first embodiment of the present invention, and FIG. 2 is a perspective view showing the structure of principal part of the recording apparatus shown in FIG. 1.

Referring to FIGS. 1 and 2, a recording apparatus main body 100 has an arithmetic control unit 8 for systematically controlling the overall apparatus. An interface unit 10, which is connected to an external host computer 11 via a cable, is connected to the arithmetic control unit 8. Recording data such as character data, image data, or the like to be recorded (or printed; "record" will be used hereinafter) is transferred from the host computer 11 to the main body 100 via the interface unit 10 under the control of the arithmetic control unit 8 and host computer 11.

A controller 5 is connected to the interface unit 10, and the transferred recording data is sent to the controller 5. The controller 5 processes the received recording data to obtain data that a recording head 1 can record on a recording paper sheet.

A head connection unit 2 which allows one of the recording head 1 and a scanner unit 16 to be attached/detached is connected to the controller 5 via a head connection line 3. The data processed by the controller 5 is sent to the recording head 1 via the head connection line 3 and head connection unit 2. The recording head 1 records a character, image, or the like on a recording paper sheet (not shown) in accordance with the received processed data.

The operation of a mechanical unit when recording data is recorded will be explained below with reference to FIGS. 1 and 2.

A cylindrical member denoted by reference numeral 15 in FIG. 2 is a platen. The platen 15 is in rolling contact with a recording paper sheet, and is rotated by a driving mechanism controlled by the arithmetic control unit 5, controller 8, and a motor driver 6 to feed the recording paper sheet. Also, the platen 15 supports the recording paper sheet, i.e., serves as a recording base.

A base-shaped carriage 13 having an encoder unit 30 is placed in the vicinity of the circumferential surface of the platen 15 to be movable along the axial direction of the platen 15. The carriage 13 carries the recording head 1 serving as a recording means upon recording, or carries the scanner unit 16 serving as an image scanning means upon image scanning, and conveys it along a recording paper sheet or an original, an image of which is to be scanned.

As shown in FIG. 1, a motor driver control unit 7 for controlling driving of a CR motor 12 that moves the carriage 13 is connected to the controller 5. The carriage 13 is moved by the mechanical unit under the control of the arithmetic control unit 8, controller 5, and motor driver 7.

Also, a sensor 9 is connected to the controller 5. The sensor 9 detects whether or not a recording paper sheet or an original to be subjected to image scanning is set on a paper table (not shown), and also detects whether or not the carriage is located at the start position.

Furthermore, the motor driver 6 is connected to the controller 5. The motor driver 6 controls driving of an LF motor 14 that rotates the platen 15 (FIG. 2) for conveying a recording paper sheet. As described above, the recording head 1 records on a recording paper sheet, which is conveyed by rotating the platen 15 by a control mechanism which is controlled by the arithmetic control unit 8, controller 5, and motor driver 6, and includes the LF motor 14.

The operation of the mechanical unit when the apparatus servers as the image scanning apparatus will be explained below with reference to FIGS. 1 and 2.

When the recording apparatus serves as the image scanning apparatus, the scanner unit 16 serving as an image scanning means moves with respect to an original (not shown) in the same manner as that upon recording using the recording head 1, so as to scan an image on the original.

The scanner unit 16 is constructed by a light source 17 for illuminating an original, a sensor 18 which has photoelectric conversion characteristics, and detects light reflected by the original, an amplifier 19 for amplifying the output signal from the sensor 18, an A/D converter 20 for analog-to-digital (A/D)-converting the amplified signal, and an image processing IC 21 for performing an image process of the digital signal generated by the A/D converter 20.

When the light source 17 illuminates an original, light reflected by characters, an image, or the like on the original is detected by the sensor 18 having the photoelectric conversion characteristics, and the sensor 18 outputs an electrical signal corresponding to the reflected light. The output signal from the sensor 18 is sent to the amplifier 19, which amplifies that signal to an optimal level that the A/D converter 20 can process. The amplified signal is converted into a digital signal by the A/D converter 20, and the digital signal undergoes a correction or image process such as shading correction, binarization, and the like by the image processing IC 21. The processed signal is transferred to the main body 100 as image data.

The image data transferred to the main body 100 is sent to the host computer 11 along a route opposite to the flow of recording data upon recording. That is, image data that has undergone the image process by the image processing IC in the scanner unit 16 is sent to the host computer 11 via the head connection unit 2, head connection line 3, controller 5, and interface unit 10. At this time, the controller 5 converts the image data sent from the image processing IC 21 into a data format that the interface unit 10 can easily send or a data format that the host computer 11 can easily process, and transfers the converted data under the control of the arithmetic control unit 8.

The mechanical unit operates as follows in such image scanning operation.

More specifically, while an original to be subjected to image scanning is in rolling contact with the platen 15, the platen 15 is rotated by the driving mechanism (not shown) to feed the original, and serves as an original base for supporting the original. Furthermore, the carriage 13 carries the scanner unit 16 serving as an image scanning means, and conveys it along the surface of the original to be subjected to image scanning, thus scanning image data. The movement of the carriage 13 is controlled by a carriage driving mechanism in the same manner as that upon recording. Also, the sensor 9 operates in the same manner as that upon recording.

Figure 3:
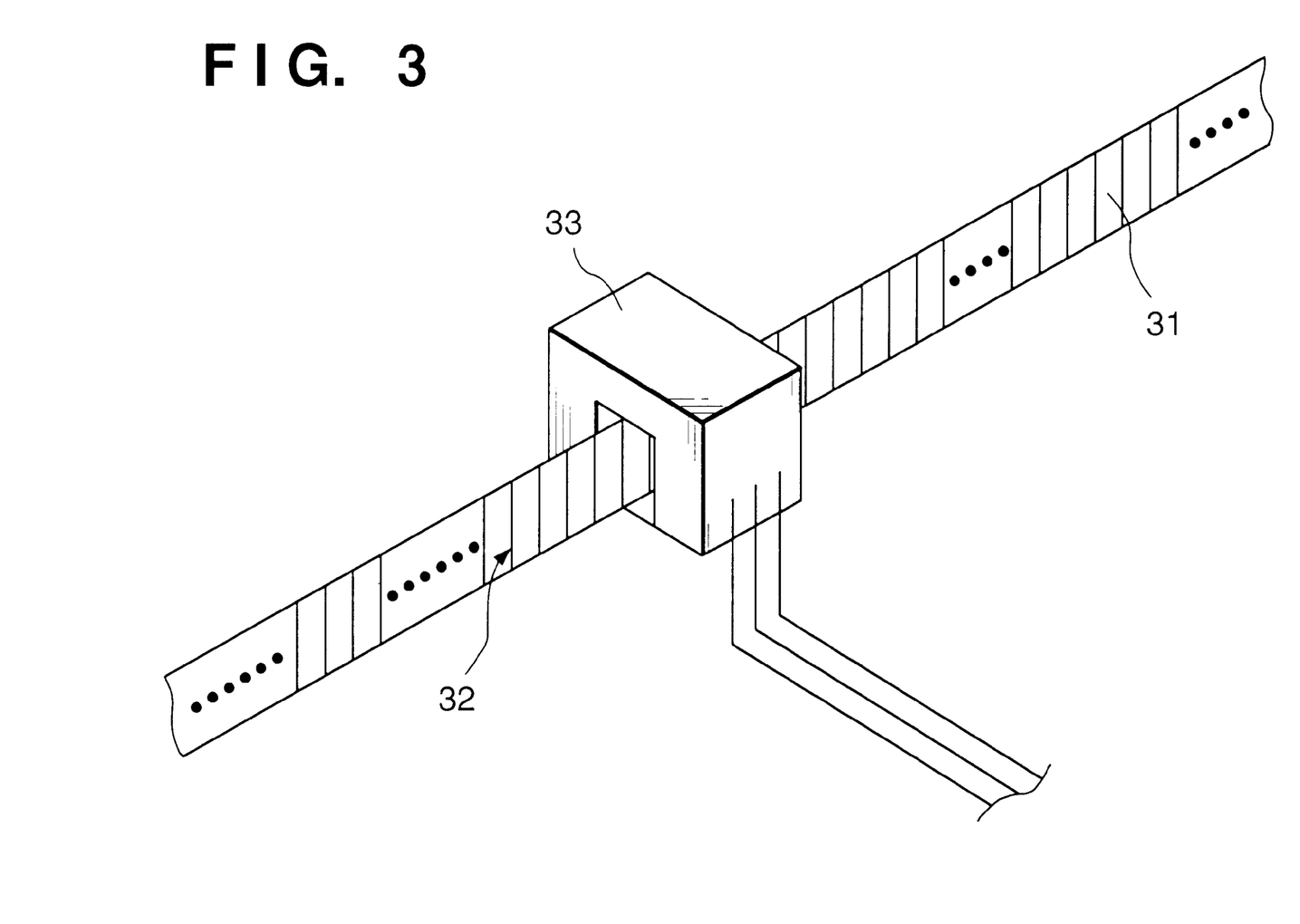
FIG. 3 is a schematic perspective view showing the outer appearance of the structure of an encoder for measuring the carriage moving position.

The encoder 30, which is attached to measure the moving position of the carriage 13 during movement of the carriage 13 will be described below with reference to FIG. 3. FIG. 3 is a schematic perspective view showing the outer appearance of the encoder 30 for measuring the carriage moving position.

For example, the encoder 30 optically measures the carriage moving position. More specifically, the encoder 30 comprises a scale 31 and photointerrupter 33. The scale 31 is graduated with scale marks 32 on a transparent member at precise pitches. Every time the photointerrupter 33 crosses each scale mark 32, the encoder 30 generates a pulse signal 34. That is, as shown in FIG. 2, the scale 31 is attached to extend in the carriage moving direction, and the photointerrupter 33 is attached to the carriage 13 with its light-receiving surface facing the scale 31 so as to be able to read the scale marks of the scale 31.

Figure 4:
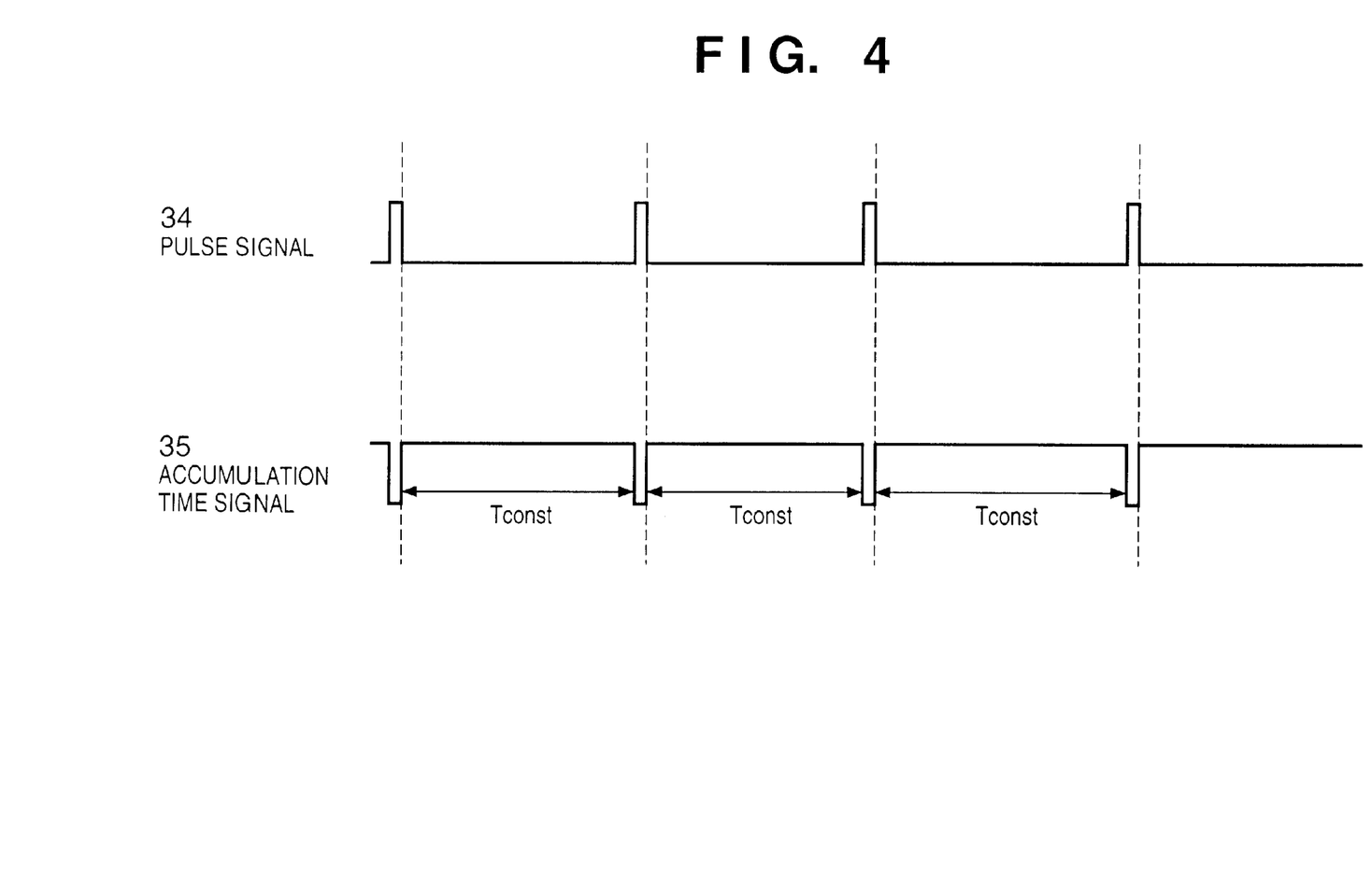
FIG. 4 is a timing chart showing the signal output timings according to the first embodiment.

Furthermore, the encoder 30 generates a pulse signal 34 shown in FIG. 4 every time it is detected that the photointerrupter 33 has crossed one scale mark 32. The pulse signal is supplied to the motor control unit 7 to feed back information that pertains to the carriage moving position. The motor control unit 7 controls the motor speed on the basis of the feedback signal, thus stabilizing the movement of the carriage 13.

When the apparatus serves as the recording apparatus, ink can be ejected with absolute positional precision with respect to a recording medium using the pulse signal 34. When the apparatus is used as the image scanning apparatus, an accumulation time signal 35 having a constant duration Tconst, which corresponds to an accumulation time as a sensor scanning time, is generated by the arithmetic processing unit 8 and controller 5 in response to each pulse signal 34, thus assuring stable scanning. Even when the moving speed of the carriage 13 becomes unstable due to some disturbance, the absolute positional relationship between the scale marks 32 of the encoder 30 and the sensor 9 can always be maintained.

As described above, according to this embodiment, since the accumulation time signal having a predetermined time duration, which corresponds to the accumulation time as the sensor scanning time of the sensor 18, is generated in response to the pulse signal, which is generated upon detecting the scale mark 32 formed on the scale 31 at given intervals, the actual position of the carriage 13 is detected in place of estimating the carriage position on the basis of the rotational speed or angle of the motor unlike in the conventional apparatus, and the accumulation time signal is generated in correspondence with the detected moving position. In this manner, even when the moving speed of the carriage varies due to some disturbance or the image scanning period varies due to nonuniformity caused by low parts precision, or the like, the absolute positional relationship between the carriage and original can be maintained, and the image on the original can be accurately scanned. Hence, an ink-jet recording apparatus which can implement high-precision image scanning when it mounts an image scanning means can be provided.

In this embodiment, the encoder 30 is constructed sing an optical sensor and scale. Also, the absolute position of the carriage may be detected by detecting a scale mark on a scale by another method, e.g., a magnetic method, and an image accumulation signal may be generated in correspondence with the detected position.

[Second Embodiment]

According to the first embodiment, an accumulation time signal having a predetermined time duration, which corresponds to the accumulation time as the sensor scanning time of the sensor 18, is generated in response to a pulse signal generated upon detecting each of the scale marks 32 formed on the scale 31 at given intervals. However, although the encoder 30 generates pulse signals 34 with high precision in correspondence with the position upon image scanning, the time interval generated by the pulse signals 34 varies depending on the mechanical precision of the motor (CR motor 12) for moving the carriage 13, motor control precision, and the like. Since the generation interval of the pulse signals 34 serves as an accumulation time setting signal for the sensor 18, if image scanning proceeds without taking any precaution, the precision, resolution, and the like of the scanned image may be adversely influenced by that interval.

Figure 5:
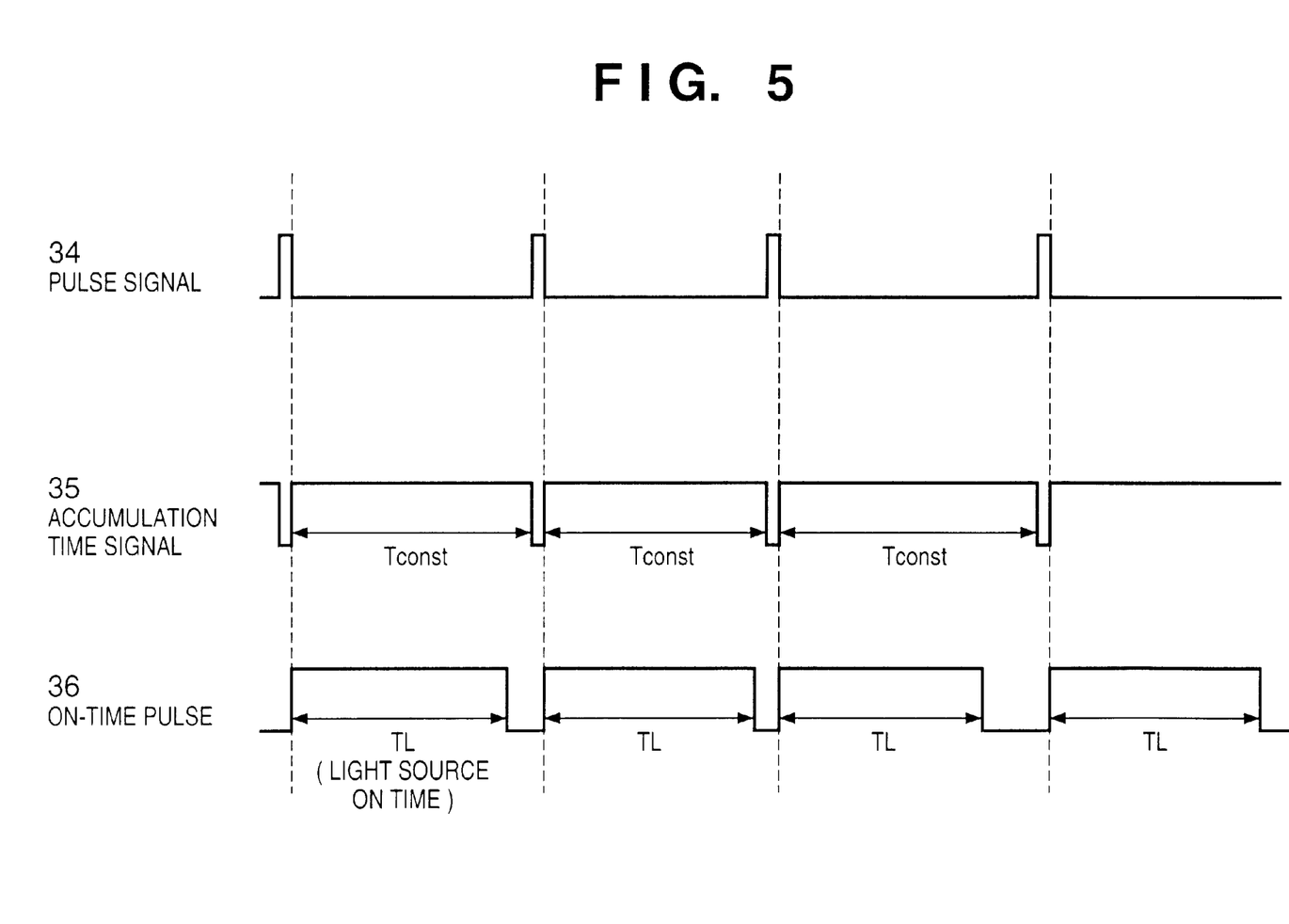
FIG. 5 is a timing chart showing the signal output timings according to the second embodiment of the present invention.

In this embodiment, in the same arrangement as that shown in FIGS. 1, 2, and 3, pulse signals 34 which contain variations of the generation interval of the signals are directly used as accumulation time signals 35, as shown in FIG. 5. However, the ON time of the light source 17 is set to be an ON time TL within the duration which is not influenced by variations of the generation interval of pulse signals 34 (i.e., a time shorter than the variation width of the generation interval of the accumulation time signals 35). This ON time pulse 36 is generated by the arithmetic processing unit 8 and controller 5, and the light source 17 is driven during only the time TL defined by the ON time pulse 36 via the image processing IC 21.

More specifically, upon scanning an image by the sensor 18, the scanning position is assured with high precision by the pulse signals 34 generated by the encoder 30, and since the light source 17 is turned on for a constant time, i.e., for a time shorter than the variation width of the generation interval of the accumulation time signals 35, the sensor 18 can receive a stable amount of reflected light without being influenced by variations of the generation interval of pulse signals 34 (i.e., variations of the generation interval of the accumulation time signal 35).

When the light source 17 is turned on for a constant time, an OFF time is produced in the accumulation time. However, during the OFF time, since the light source is OFF, the received light amount is zero, and does not influence the stable received light amount during the ON time.

As described above, according to this embodiment, since the apparatus comprises a distance measuring means for generating pulse signals 34 at given positions by accurately measuring the moving position of the carriage 13, and also a constant time ON means which can turn on the light source during a predetermined time duration in response to each pulse signal 34 generated by the distance measuring means, light for scanning information can be stably supplied at an accurate position, and information on a recording medium can be accurately scanned. In this manner, a recording apparatus with a high-precision, high-resolution scanner function can be implemented.

The present invention is not limited to the apparatuses of the aforementioned embodiments, and may be applied to either a system constituted by a plurality of devices, or an apparatus consisting of a single equipment. The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, an effect of implementing higher-precision, higher-resolution image scanning and preventing disturbance of the scanned image when an image scanning means is mounted can be obtained.

In addition to the above effect, especially, the accumulation time of the image scanning means can be made constant.

Also, the absolute positional relationship between a carriage moving means and original can be maintained, and an image on the original can be accurately scanned. Hence, the effect of implementing higher-precision, higher-resolution image scanning and preventing disturbance of the scanned image when an image scanning means is mounted can be obtained.

Light for scanning information can be stably supplied at an accurate position, and information on a recording medium can be scanned with high precision. In this way, a recording apparatus with a high-precision, high-resolution scanner function can be implemented.

Upon scanning information, high precision of the scanning position can be guaranteed by a scanning time signal output from a scanning time signal generation means.

Also, information can be scanned more stably without being influenced by variations of the generation interval of the scanning time signals.

The present invention is not limited to the above embodiments and various changes and modifications can be made within the spirit and scope of the present invention. Therefore, to apprise the public of the scope of the present invention the following claims are made.

What is claimed is:

1. An information scanning apparatus which comprises a scanning unit which scans information on a recording medium using light emitted by a light source, and a carriage unit which supports and moves said scanning unit, comprising:
   a distance measuring unit which measures a moving position of said carriage unit;
   an ON time signal generation unit which generates an ON time signal for turning on the light source on the basis of a measurement result of said distance measuring unit; and
   a scanning time signal generation unit which generates a scanning time signal indicating an information scanning time of said scanning unit on the basis of the measurement result of said distance measuring unit,
   wherein said ON time signal generation unit turns on the light source for a predetermined time shorter than a generation interval of the scanning time signal.

2. The apparatus according to claim 1, wherein a light emitting time of the light source turned on by the ON time signal is constant.

3. The apparatus according to claim 1, wherein the light source is turned off at the end of the information scanning time by the ON time signal.

4. The apparatus according to claim 1, wherein said distance measuring unit has a scale on which graduations are formed with a predetermined pitch, detection unit which detects the graduations, and an output unit which outputs a signal indicating that said carriage unit is at a predetermined position when the graduations are detected by said detection unit.

5. The apparatus according to claim 4, wherein said detection unit has an optical sensor.

6. The apparatus according to claim 4, wherein said detection unit has a magnetic sensor.

7. A recording apparatus, which comprises a carriage unit on which a detachable unit which scans images and records information on a recording medium using light emitted by a light source is detachably attached, and which supports and moves said detachable unit which scans and records, comprising:

a distance measuring unit which measures a moving position of said carriage unit;

an ON time signal generation unit which generates an ON time signal for turning on the light source on the basis of a measurement result of said distance measuring unit upon scanning by said detachable unit; and a scanning time signal generation unit which generates a scanning time signal indicating an image scanning time of said detachable unit on the basis of the measurement result of said distance measuring unit, wherein said ON time signal generation unit turns on the light source for a predetermined time shorter than a generation interval of the scanning time signal.

8. The apparatus according to claim 7, wherein a light emitting time of the light source turned on by the ON time signal is constant.

9. The apparatus according to claim 7, wherein the light source is turned off at the end of the image scanning time by the ON time signal.

10. The apparatus according to claim 7, wherein said distance measuring unit has a scale on which graduations are formed with a predetermined pitch, detection unit which detects the graduations, and an output unit which outputs a signal indicating that said carriage unit is at a predetermined position when the graduations are detected by said detection unit.

11. The apparatus according to claim 10, wherein said detection unit has an optical sensor.

12. The apparatus according to claim 10, wherein said detection unit has a magnetic sensor.

13. An information scanning method using an information scanning apparatus which comprises a scanning unit which scans information on a recording medium using light emitted by a light source, and a carriage unit which supports and moves said scanning unit, executing:

a distance measuring process for measuring a moving position of said carriage unit;

an ON time signal generation process for generating an ON time signal for turning on the light source on the basis of a measurement result of said distance measuring process; and a scanning time signal generation process for generating a scanning time signal indicating an information scanning time of said scanning unit on the basis of the measurement result of said distance measuring process, wherein said ON time signal generation process turns on the light source for a predetermined time shorter than a generation interval of the scanning time signal.

14. The method according to claim 13, wherein a light emitting time of the light source turned on by the ON time signal is constant.

15. The method according to claim 13, wherein the light source is turned off at the end of the information scanning time by the ON time signal.

16. The method according to claim 13, wherein said information scanning apparatus further comprises a distance measuring unit that has a scale on which graduations are formed with a predetermined pitch, and wherein said information scanning method further comprises a detection process which detects the graduations, and an output process which outputs a signal indicating that said carriage unit is at a predetermined position when the graduations are detected by said detection process.

17. The method according to claim 16, wherein said detection process accesses an optical sensor.

18. The method according to claim 16, wherein said detection process accesses a magnetic sensor.

19. A storage medium, which stores a computer readable program for executing an information scanning method of an information scanning apparatus which comprises a scanning unit which scans information on a recording medium using light emitted by a light source, and a carriage unit which supports and moves said scanning unit, said information scanning method comprising:

a distance measuring step of measuring a moving position of said carriage unit;

an ON time signal generation step of generating an ON time signal for turning on the light source on the basis of a measurement result in the distance measuring step; and a scanning time signal generation step of generating a scanning time signal indicating an information scanning time of said scanning unit on the basis of the measurement result in the distance measuring step, wherein the ON time signal generation step includes the step of turning on the light source for a predetermined time shorter than a generation interval of the scanning time signal.

20. The medium according to claim 19, wherein a light emitting time of the light source turned on by the ON time signal is constant.

21. The medium according to claim 19, wherein the light source is turned off at the end of the information scanning time by the ON time signal.

22. The medium according to claim 19, wherein said information scanning apparatus further comprises a distance measuring unit that has a scale on which graduations are formed with a predetermined pitch, and wherein said information scanning method further comprises a detection step which detects the graduations, and an output step which outputs a signal indicating that said carriage unit is at a predetermined position when the graduations are detected in said detection step.

23. The medium according to claim 22, wherein said detection step accesses an optical sensor.

24. The medium according to claim 22, wherein said detection step accesses a magnetic sensor.

* * * * *

UNITED STATES PATENT AND TRADEMARK OFFICE
CERTIFICATE OF CORRECTION

PATENT NO. : 6,422,682 B1
DATED : July 23, 2002
INVENTOR(S) : Kaneko et al.

It is certified that error appears in the above-identified patent and that said Letters Patent is hereby corrected as shown below:

Column 6,
Line 42, "constructed sing an" should read -- constructed using an --

Signed and Sealed this

Eighteenth Day of February, 2003

JAMES E. ROGAN
*Director of the United States Patent and Trademark Office*